July 1, 1958 G. A. LYON 2,841,445
WHEEL COVER
Filed Sept. 14, 1955
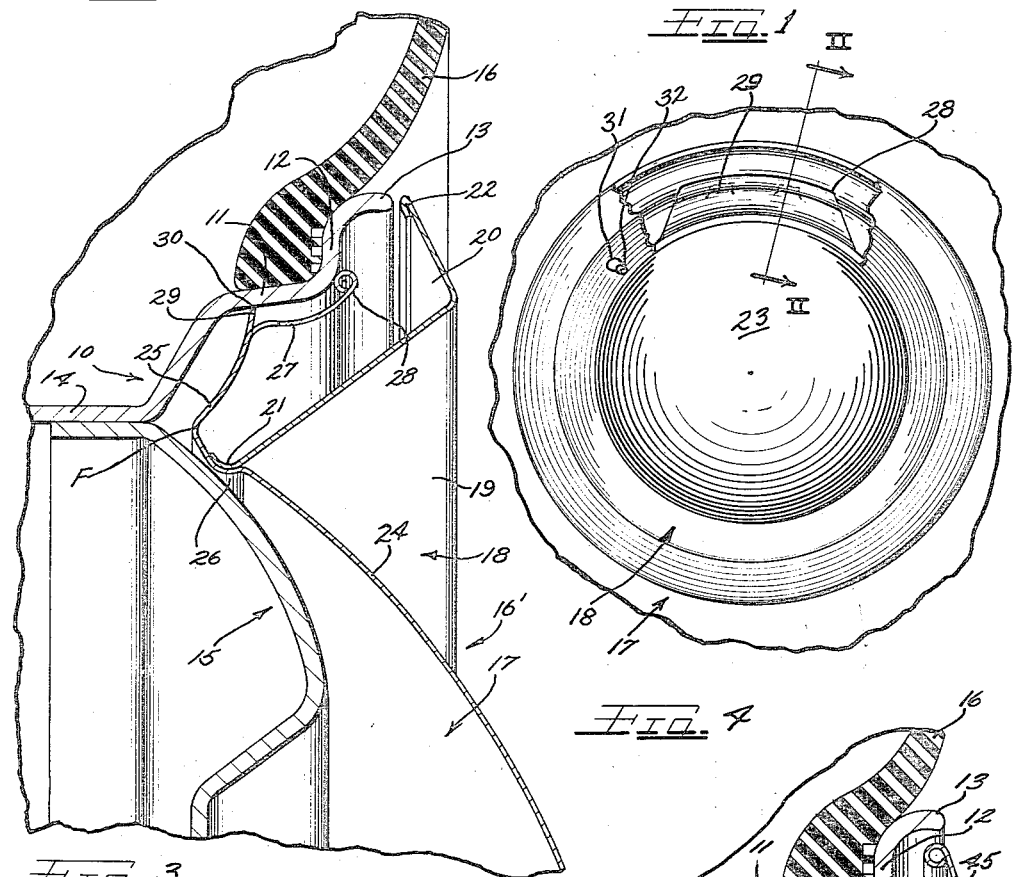
Inventor
GEORGE ALBERT LYON

# United States Patent Office 2,841,445
Patented July 1, 1958

2,841,445

WHEEL COVER

George Albert Lyon, Detroit, Mich.

Application September 14, 1955, Serial No. 534,190

8 Claims. (Cl. 301—37)

This invention relates generally to wheel structures and more particularly to a novel multi-part ornamental wheel cover.

In the automobile industry there is a never ending quest for ornamental wheel covers having an outstanding appearance. Of necessity, the covers must have retaining means capable of developing adequate gripping capacities. Still further, in order for the manufacturer to be able to compete with competition the cover must be of as economical a construction as possible.

Accordingly, an object of this invention is to provide a new and outstanding cover construction having a highly ornamental appearance.

Still another object of this invention is to provide the cover with retaining means having the desired gripping capacities.

Still another object of this invention is to provide a cover construction which is economical to manufacture on a large production basis.

According to the general features of the present invention there is provided in a wheel structure having a tire rim with a generally axial annular flange, a circular cover member including inner and outer cover portions for overlying disposition on the wheel, the cover having circumferentially spaced generally radially outwardly extending portions provided with a cover retaining extremity capable of progressive camming cover retaining engagement with the axial rim flange, said portions terminating in a shouldered extremity capable of bottomed engagement against the tire rim in order to preclude axially inward deflection of the cover.

Another feature of the present invention relates to the retaining extremity being struck out from the radially extending portion.

Other objects and features of this invention will more fully appear from the following detailed description taken in connection with the accompanying drawing illustrating several embodiments and in which:

Figure 1 is a front view of a wheel structure embodying the features of this invention and partly broken away in order to show the relative position of the retaining tabs and arcuate shoulder;

Figure 2 is a vertical fragmentary enlarged cross sectional view taken on the line II—II of Figure 1 looking in the direction indicated by the arrows;

Figure 3 is a rear elevation of my novel cover; and

Fig. 4 is a vertical fragmentary enlarged cross sectional view illustrating a modified form of my invention.

As shown on the drawings:

The reference character 10 designates generally a multi-flanged drop center type of tire rim which includes an axial flange 11 joined to a radial flange 12 having an axially outwardly curved terminal 13, as well as a base flange 14 which is attached at spaced intervals to the usual wheel body part or spider 15. This spider or body part has at its center the usual bolt-on flange (not shown) by means of which the wheel may be attached to a suitable support on an automobile.

The drop center tire rim 10 is adapted to accommodate in a well known way a pneumatic tire 16 which may be either of the tube or tubeless type.

The reference numeral 16' indicates generally my novel circular cover which may be stamped from sheet steel or other suitable materials. In the first embodiment of my invention, the cover 16' includes inner and outer cover members 17 and 18.

The outer cover member 18 comprises a circular ring having diverging portions 19 and 20 connected together, with diverging portion 19 terminating in an annular arcuate edge or rib 21, and with the other diverging portion 20 terminating in a curled-under pry-off edge 22 for overlying in confronting relation with the tire rim 10.

The inner cover member 17 includes a central crown area 23 having an axially and radially inwardly inclined surface 24 which converges with the diverging portion 19 on the outer cover member 18.

Formed integral with and positioned about the outer margin of inner cover member 17 at circumferentially spaced intervals are a plurality of generally radially outwardly extending portions 25. It will be noted that at the junction of the portions 25 and the surface 24 is provided an annular grooved flange 26 which is capable of receiving outer cover member extremity 21 in interlocking retained engagement.

The generally radially outwardly extending portion 25 is of a resilient construction and terminates at its other end in a generally axially outwardly extending segment or portion 27 which in turn terminates in a curled-under or shouldered terminal portion 28. At generally the junction of segments or portions 25 and 27 is provided at least one and preferably two or more generally radially outwardly struck out tabs 29, the tabs 29 each terminating in a gripping edges 30.

In view of the foregoing it will now be apparent that the instant cover construction operates in the following manner.

Initially, the outer cover member or ring 18 is pressed over the inner cover member 17 with the rib 21 interlocking with the grooved flange 26.

In assembly of the cover on the wheel, the valve stem aperture 31 is aligned with valve stem 32 and the cover is thereafter urged axially inwardly. As the cover is urged axially inwardly, each of the portions 25 are stressed, with the result that the tab edge 30 is tightly engaged against the axially and radially inwardly inclined flange 11. The cover is eventually stressed into a bottomed relationship with the bead 28 bottoming generally at the junction of the axial and radial flanges 11 and 12.

Removal of the cover may be effected by inserting a suitable pry-off tool beneath pry-off edge 22 and subsequently under bead 28 and upon a twisting levering action the portion 25 flexes generally at F until the tab edge 30 is disengaged from flange 11.

In Figure 4 a modified form of my invention is shown and where identical parts are found the same reference numerals have been again used.

In this instance, cover 35 is of a dished construction having converging surfaces 36 and 37 joined together in an annular generally radially extending flange 38.

At circumferentially spaced intervals about the flange 38, separate pieces in the form of retaining clips 39 are riveted at 40 to the cover 35. It will be noted that in riveting the cover to the clips 39, an opening is created in the flange and clip indicated generally by the reference numeral 41. This opening 41 is positioned closely adjacent wheel opening 42 and thereby allows air to freely circuate therethrough to cool the brake drum.

Each of the clips 39 includes a generally radially extending portion or segment 43 which is connected at its outer end to a generally axially and radially outwardly extending portion or segment 44 which in turn terminates in a curled or beaded or shouldered extremity 45. Struck out from the portion or segment 44 at the junction of the portions 43 and 44 are tabs 46 which each terminate in an edge 47.

In this instance the clips function in the same manner as the corresponding retaining means on the cover in the first form of my invention. Furthermore, the cover may be assembled on the wheel and removed therefrom in the same manner. It will be appreciated that as the tab edge 47 is fixed along the axial flange 11, portion 43 is stressed, thereby effecting a tensioned engagement between the cover and tire rim.

It will be understood that modifications and variations may be effected without departing from the scope of the novel concepts of the present invention.

I claim as my invention:

1. In a wheel structure having rim and body parts with one of the parts having a generally axial flange, a circular cover member including inner and outer cover portions for overlying disposition on the wheel, said cover having circumferentially spaced generally radially extending cover retaining portions each provided with a cover retaining extremity capable of progressive camming cover retaining engagement with the axial flange, said portions terminating in flexible shouldered extremities movable independent of one another capable of bottomed engagement against the wheel in order to preclude axially inward deflection of the cover, said retaining extremity being struck out and turned radially away from said cover retaining portions for edgewise engagement with the axial flange.

2. In a wheel structure having rim and body parts with one of the parts having a generally axial flange, a circular cover member including inner and outer cover portions for overlying disposition on the wheel, said cover having circumferentially spaced generally radially outwardly extending portions each provided with a cover retaining structure capable of progressive camming cover retaining engagement with the axial flange, said portions terminating in flexible shouldered extremities movable independent of one another capable of bottomed engagement against the wheel in order to preclude axially inward deflection of the cover, said radially outwardly extending portion comprising a relatively large arcuate segment and said retaining structure including at least two radially outwardly extending struck out tabs on said segment for retaining cooperation with the axial flange.

3. In a wheel structure having rim and body parts with one of the parts having a generally axial flange, a circular cover member including inner and outer cover portions for overlying disposition on the wheel, said cover having circumferentially spaced generally radially outwardly extending portions each provided with a turned cover retaining extremity capable of progressive camming cover retaining engagement with the axial flange, said portions terminating in flexible shouldered extremities movable independent of one another and capable of bottomed engagement against the wheel in order to preclude axially inward deflection of the cover, said inner and outer portions comprising separate members capable of interlocking engagement in assembly.

4. In a wheel structure having rim and body parts with one of the parts having a generally axial flange, a circular cover member including inner and outer cover portions for overlying disposition on the wheel, said cover having circumferentially spaced generally radially outwardly extending portions each provided with a turned cover retaining extremity capable of progressive camming cover retaining engagement with the axial flange, said portions terminating in flexible shouldered extremities movable independent of one another and capable of bottomed engagement against the wheel in order to preclude axially inward deflection of the cover, said generally radially outwardly extending portions comprising a separate piece and being attached to the cover at the junction of the cover portions.

5. In a wheel structure having rim and body parts with one of the parts having a generally axial flange, a circular cover member including inner and outer cover portions for overlying disposition on the wheel, said cover having circumferentially spaced resilient generally radially outwardly extending generally L-shaped portions each flexible independent of one another and each provided with a cover retaining extremity capable of progressive camming cover retaining engagement with the axial flange, said portions terminating in individual shouldered extremities each movable independent of one another and capable of bottomed engagement against the wheel in order to preclude axially inward deflection of the cover.

6. In a wheel structure having rim and body parts with one of the parts having a generally axial flange, a circular cover member including inner and outer cover portions for overlying disposition on the wheel, said cover having circumferentially spaced resilient generally radially outwardly extending generally L-shaped portions each flexible independent of one another and each provided with a cover retaining extremity capable of progressive camming cover retaining engagement with the axial flange, said portions terminating in individual shouldered extremities each movable independent of one another and capable of bottomed engagement against the wheel in order to preclude axially inward deflection of the cover, said shouldered extremity comprising an arcuately curled bead.

7. In a wheel structure having rim and body parts with one of the parts having a generally axial flange, a circular cover including inner and outer cover members in retained engagement with one another and with the inner cover member having at its outer circular margin resilient independently deflectable circumferentially spaced generally axially extending portions each provided with a short stiff cover retaining extremity capable of progressive edgewise camming cover retaining engagement with the axial flange, said radially extending portions each terminating in individual shouldered extremities each movable independent of one another capable of bottomed engagement against the wheel in order to preclude axially inward deflection of the cover.

8. In a wheel structure having rim and body parts with one of the parts having a generally axial flange, a circular cover member including inner and outer cover portions for overlying disposition on the wheel, said cover having resilient independently deflectable circumferentially spaced generally radially outwardly extending portions each provided with a short stiff cover retaining extremity capable of progressive edgewise camming cover retaining engagement with the axial flange, said radially extending portions each terminating in individual shouldered extremities each movable independent of one another capable of bottomed engagement against the wheel in order to preclude axially inward deflection of the cover, each of said portions including a generally radial segment and a generally axial segment with retaining tabs struck out generally at the junction of the segments.

References Cited in the file of this patent

UNITED STATES PATENTS

| | | |
|---|---|---|
| 2,490,822 | Lyon | Dec. 13, 1949 |
| 2,660,478 | Lyon | Nov. 24, 1953 |
| 2,683,629 | Lyon | July 13, 1954 |